(12) United States Patent
Kawamura et al.

(10) Patent No.: US 10,152,057 B2
(45) Date of Patent: Dec. 11, 2018

(54) AUTONOMOUS MOBILE DEVICE, AUTONOMOUS MOVEMENT METHOD, AND RECORDING MEDIUM STORING PROGRAM

(71) Applicant: CASIO COMPUTER CO., LTD., Shibuya-ku, Tokyo (JP)

(72) Inventors: Yoshihiro Kawamura, Fussa (JP); Hiroki Atsumi, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/332,109

(22) Filed: Oct. 24, 2016

(65) Prior Publication Data

US 2017/0153638 A1 Jun. 1, 2017

(30) Foreign Application Priority Data

Nov. 30, 2015 (JP) ................. 2015-233164

(51) Int. Cl.
G05D 1/00 (2006.01)
G05D 1/02 (2006.01)
G01C 5/00 (2006.01)

(52) U.S. Cl.
CPC ............ *G05D 1/0088* (2013.01); *G01C 5/00* (2013.01); *G05D 1/0212* (2013.01); *G05D 1/0214* (2013.01); *G05D 2201/0214* (2013.01); *Y10S 901/01* (2013.01)

(58) Field of Classification Search
CPC .. G05D 1/0088; G05D 1/0212; G05D 1/0214; G05D 2201/0214; G01C 5/00; Y10S 901/01

USPC .......... 701/23, 1; 700/245, 248, 261; 901/1; 182/19

See application file for complete search history.

(56) References Cited

U.S. PATENT DOCUMENTS

| | | | | |
|---|---|---|---|---|
| 7,155,308 | B2* | 12/2006 | Jones | G05D 1/0238 318/568.1 |
| 9,798,328 | B2* | 10/2017 | Vicenti | G05D 1/0242 |
| 2002/0016649 | A1* | 2/2002 | Jones | G05D 1/0238 700/245 |
| 2002/0189045 | A1* | 12/2002 | Mori | A47L 9/009 15/319 |
| 2012/0084004 | A1* | 4/2012 | Alexandre | G01C 21/206 701/527 |
| 2012/0254624 | A1* | 10/2012 | Malkhasyan | G06F 21/572 713/189 |
| 2012/0265391 | A1* | 10/2012 | Letsky | A01D 34/008 701/25 |
| 2016/0101319 | A1* | 4/2016 | Tanabe | A61B 5/1118 434/255 |

(Continued)

FOREIGN PATENT DOCUMENTS

JP    2015128795 A    7/2015
JP    WO 2015102077 A1 *    7/2015    ......... B23Q 11/0075

*Primary Examiner* — Marthe Y Marc-Coleman
(74) *Attorney, Agent, or Firm* — Holtz, Holtz & Volek PC (57) ABSTRACT

An acquirer of an autonomous mobile device acquires a value of level difference between a datum level and the device. A determiner determines whether the value of level difference acquired by the acquirer is equal to or higher than a given value. A movement restrictor restricts parallel shift of the device when the determiner determines that the value is equal to or higher than the given value.

8 Claims, 4 Drawing Sheets

(56) References Cited

U.S. PATENT DOCUMENTS

| | | | | |
|---|---|---|---|---|
| 2016/0103451 A1* | 4/2016 | Vicenti | ................ | G05D 1/0242 |
| | | | | 700/259 |
| 2016/0245716 A1* | 8/2016 | Gum | .................... | G01L 27/002 |
| 2016/0299503 A1* | 10/2016 | Wolfe | .................... | A47L 9/2805 |
| 2016/0311076 A1* | 10/2016 | Matsumoto | ........ | B23Q 11/0075 |

* cited by examiner

AUTONOMOUS MOBILE DEVICE, AUTONOMOUS MOVEMENT METHOD, AND RECORDING MEDIUM STORING PROGRAM

CROSS-REFERENCE TO RELATED APPLICATION

This application claims the benefit of Japanese Patent Application No. 2015-233164, filed on Nov. 30, 2015, the entire disclosure of which is incorporated by reference herein.

FIELD

This application relates generally to a technique of restricting movement of an autonomous mobile device such as a robot.

BACKGROUND

Recently, autonomous mobile devices autonomously moving according to the intended purpose have become widely used. For example, autonomous mobile devices autonomously moving for cleaning indoor spaces are known.

Here, Patent Literature 1 discloses an autonomous mobile device for cleaning comprising fall prevention sensors on its bottom surface and controlling the run to prevent the fall when the table surface is no longer detected.

Patent Literature 1: Unexamined Japanese Patent Application Kokai Publication No. 2015-128795.

SUMMARY

The autonomous mobile device of the present disclosure includes:

a mover conducting parallel shift to change a position of the device; and a movement restrictor restricting the parallel shift of the device when a given condition related to a height is satisfied while the device is not on a datum level.

BRIEF DESCRIPTION OF THE DRAWINGS

A more complete understanding of this application can be obtained when the following detailed description is considered in conjunction with the following drawings, in which.

DETAILED DESCRIPTION

Figure 1:
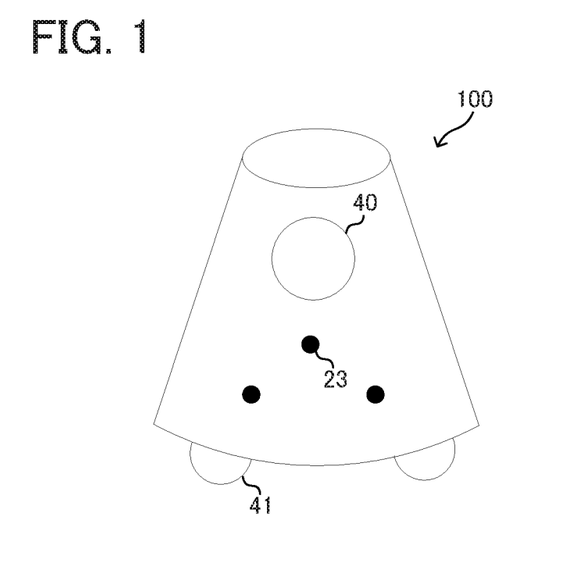
FIG. 1 is an illustration showing the appearance of the autonomous mobile device according to an embodiment.

The autonomous mobile device according to an embodiment of the present disclosure will be outlined hereafter with reference to FIG. 1. An autonomous mobile device 100 is an autonomous mobile robot autonomously moving according to the intended purpose. The intended purpose of autonomous movement includes, for example, monitoring for security, indoor cleaning, and toys. In other words, the autonomous mobile device (autonomous mobile robot) takes a form of security-monitoring robot, indoor cleaning robot, toy robot, or the like depending on the intended purpose. These robot forms are given simply by way of example and the autonomous mobile device is applicable to any robot autonomously moving.

The autonomous mobile device 100 apparently comprises a camera 40, a drive mechanism 41, and obstacle detection sensors 23.

The camera 40 is a monocular imaging device. The camera 40 acquires images (frames) at, for example, 30 fps. The autonomous mobile device 100 autonomously moves while recognizing in real time its own position and surrounding environments based on the images successively acquired by the camera 40.

The drive mechanism 41 is of an independent two-wheel drive type and comprises wheels and motors. The autonomous mobile device 100 conducts forward or backward parallel shift (translational movement) when the two wheels are driven in the same direction and rotates (turns) on the spot when the two wheels are driven in opposite directions. The drive mechanism 41 is a kind of a mover. Here, the parallel shift refers to movement to change the position. The rotation is distinguished from the parallel shift because only the orientation changes and the position does not change.

The obstacle detection sensors 23 are sensors detecting obstacles while running and, for example, infrared sensors or ultrasonic sensors.

Figure 2A:
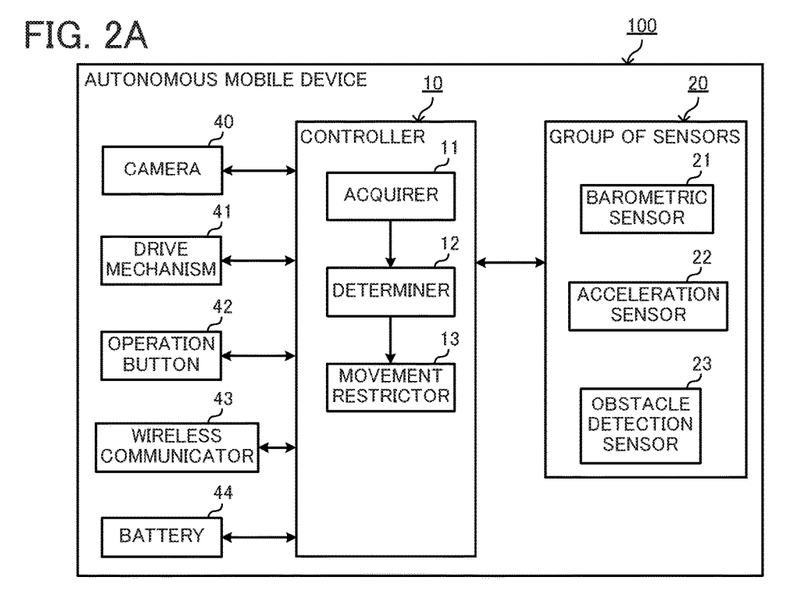
FIG. 2A is a diagram showing the configuration of the autonomous mobile device according to the embodiment.

As shown in FIG. 2A, the autonomous mobile device 100 comprises, in addition to the apparently provided camera 40, drive mechanism 41, and obstacle detection sensors 23, a controller 10, a group of sensors 20, an operation button 42, a wireless communicator 43, and a battery 44.

The controller 10 is configured by a central processing unit (CPU), a read only memory (ROM), a random access memory (RAM), and the like. The controller 10 executes programs (for example, programs regarding the movement control procedure described later) stored in the ROM to realize the functions of components (an acquirer 11, a determiner 12, and a movement restrictor 13).

The group of sensors 20 includes, in addition to the obstacle detection sensors 23, a barometric sensor 21 and an acceleration sensor 22. The barometric sensor 21 is a sensor measuring the atmospheric pressure with a pressure-sensitive element. The acceleration sensor 22 is a sensor measuring the acceleration in the XYZ directions (three axes). The barometric sensor 21 and acceleration sensor 22 are used for obtaining the elevation from a floor surface. As a barometric sensor, a device capable of measuring with accuracy equivalent in elevation to approximately 3 cm is in practical use. Here, the floor surface means a surface of uniform level that extends enough for the autonomous mobile device 100 to run around, and includes, for example, a ground, a table surface and so on. The level of the floor surface is one of a datum level.

The operation button 42 is a button for operating the autonomous mobile device 100 and includes, for example, a power button and a mode switching button.

The wireless communicator 43 is a wireless module including an antenna for wireless communication with an external device. For example, the wireless communicator 43 is a wireless module for short distance wireless communication based on the Bluetooth (registered trademark).

The battery 44 is a rechargeable battery built in the autonomous mobile device 100. The battery 44 is charged by docking the autonomous mobile device 100 in a charging station (home base).

The function of the controller 10 will be described next.

The controller 10 functionally comprises an acquirer 11 (acquisition means), a determiner 12 (determination means), and a movement restrictor 13 (movement restriction means).

The acquirer 11 acquires a value of level difference between the floor surface and the device. Specifically, the acquirer 11 acquires the level difference based on the atmospheric pressure difference between an atmospheric pressure acquired by the barometric sensor 21 and a reference atmospheric pressure acquired by a reference barometric sensor 200 installed on the floor surface.

Figure 3:
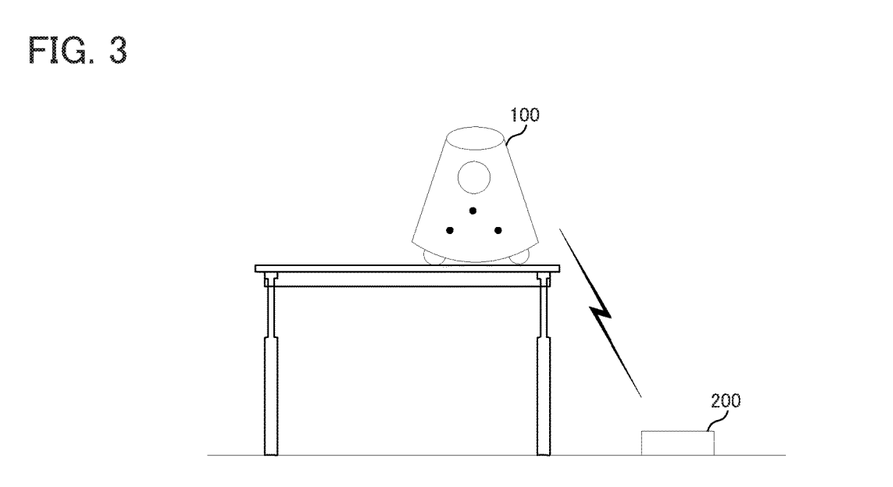
FIG. 3 is an illustration showing wireless communication of the autonomous mobile device on a table surface.

As shown in FIG. 3, the autonomous mobile device 100 (the wireless communicator 43 thereof) receives a reference atmospheric pressure value presenting the atmospheric pressure on the floor surface acquired by the reference barometric sensor 200 through wireless communication. The reference barometric sensor 200 may be installed on the floor surface alone with a wireless module or may be built in the charging station with a wireless module. The acquirer 11 acquires the level difference from the floor surface based on the atmospheric pressure difference that is the difference between the received reference atmospheric pressure value and the atmospheric pressure value acquired by the barometric sensor 21 of the device.

As another technique, the acquirer 11 acquires the level difference by calculating the double integral of acceleration in the vertical direction (Z-direction) from the floor surface acquired by the acceleration sensor 22. Specifically, when accelerated in the vertical direction (for example, when the user lifts the autonomous mobile device 100), the elevation obtained by calculating the double integral of acceleration in the vertical direction is the level difference from the floor surface.

As described above, the acquirer 11 acquires a value of level difference from the floor surface by the barometric sensor 21 or acceleration sensor 22.

The determiner 12 determines whether the value of level difference acquired by the acquirer 11 is equal to or higher than a given value. For example, if the given value is 10 cm, the determiner 12 determines whether the level difference acquired by the acquirer 11 is equal to or larger than 10 cm.

When the determiner 12 determines that the value is equal to or higher than the given value, the movement restrictor 13 restricts movement of the device. Specifically, when the determiner 12 determines that the value is equal to or higher than the given value, the movement restrictor 13 stops the parallel shift of the device. As a result, the autonomous mobile device 100 only rotates on the spot.

On the other hand, if the determiner 12 determines that the value is lower than the given value, the movement restrictor 13 does not restrict the parallel shift and rotation of the device. As a result, the autonomous mobile device 100 continues to move according to the intended purpose.

Figure 2B:
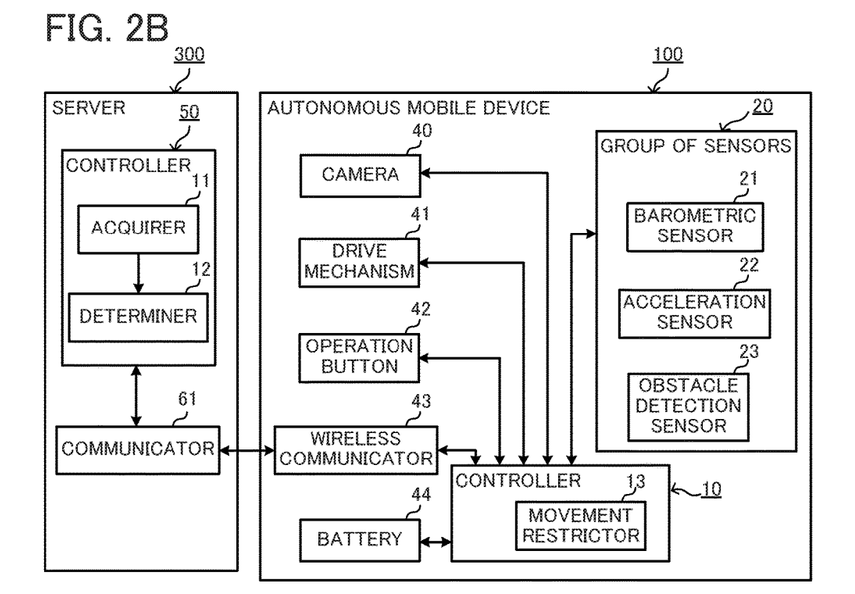
FIG. 2B is a diagram showing the configuration when the autonomous mobile device according to the embodiment communicates with an external server.

Here, as shown in FIG. 2B, the controller 10 may be provided entirely or partly outside the autonomous mobile device 100 and externally control the autonomous mobile device 100. In the example shown in FIG. 2B, an external server 300 comprises a controller 50 and a communicator 61 and the controller 50 of the server 300 comprises the acquirer 11 and determiner 12 of the controller 10 of the autonomous mobile device 100 in FIG. 2A. Then, the wireless communicator 43 of the autonomous mobile device 100 and the communicator 61 of the server 300 communicate. Through this communication, the autonomous mobile device 100 transmits the values acquired by the group of sensors 20 to the server 300 and the movement restrictor 13 of the autonomous mobile device 100 restricts the parallel shift of the device by the drive mechanism 41 based on the determination result of the determiner 12 of the server 300 received via the wireless communicator 43.

Figure 4:
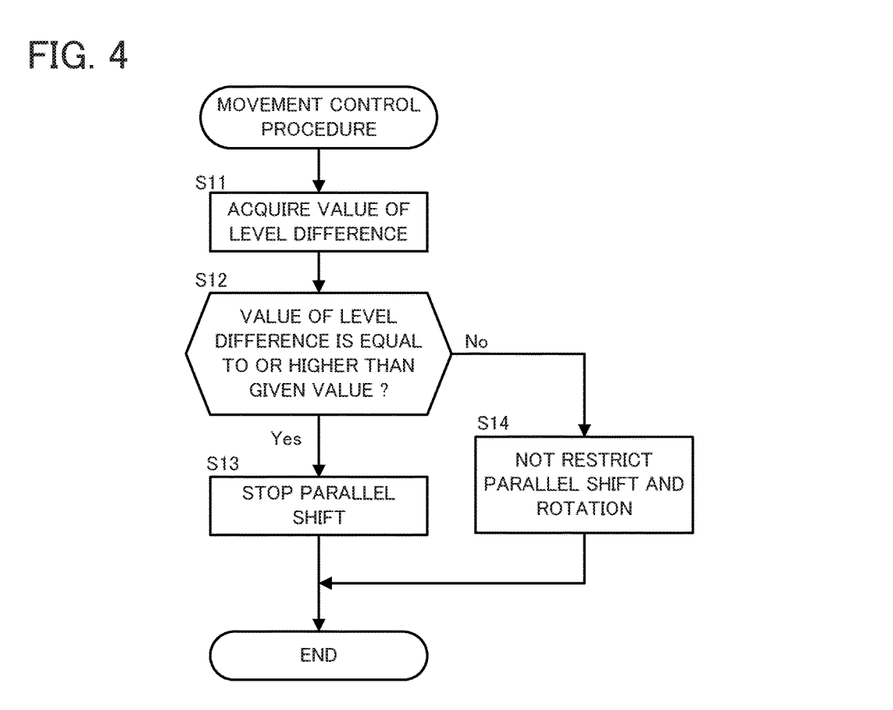
FIG. 4 is a flowchart of the movement control procedure according to the embodiment.

The movement control procedure will be described next with reference to FIG. 4. The movement control procedure is executed at given intervals while the autonomous mobile device 100 autonomously moves. For example, the movement control procedure is executed at intervals of one second.

First, the acquirer 11 acquires a value of level difference (Step S11). The level difference is acquired using either one, the barometric sensor 21 or acceleration sensor 22.

Then, the determiner 12 determines whether the value of level difference is equal to or higher than a given value (Step S12). Here, if the value of level difference is equal to or higher than a given value (Step S12; Yes), the movement restrictor 13 stops the parallel shift (Step S13). On the other hand, if the value of level difference is lower than a given value (Step S12; No), the movement restrictor 13 does not restrict the parallel shift and rotation (Step S14).

As described above, comprising the components (acquirer 11, determiner 12, and movement restrictor 13), the autonomous mobile device 100 according to this embodiment restricts movement of the device when the level difference is equal to or larger than a given value. In this embodiment, the parallel shift is stopped by way of example. Therefore, even when the boundary between objects high above the floor surface is flat (for example, when a cardboard is placed on a table surface), the autonomous mobile device 100 is prevented from falling due to its own weight. Hence, the fall can be prevented with accuracy.

Moreover, in this embodiment, the level difference is obtained from the relative atmospheric pressure difference between the built-in barometric sensor 21 and reference barometric sensor 200. Therefore, the level difference can be obtained with higher accuracy than using the absolute atmospheric pressure that fluctuates depending on the weather. Moreover, the acceleration sensor 22 is also used for obtaining the level difference. Then, the acceleration sensor 22 can be used depending on the situation such as where the wireless communication is unavailable.

Moreover, in this embodiment, the movement restrictor 13 does not restrict the parallel shift and rotation of the device when the determiner 12 determines that the value is lower than a given value. As a result, the autonomous mobile device 100 can continue to move according to the intended purpose. For example, if the autonomous mobile device 100 is a cleaning robot, it can continue to clean.

The case in which the autonomous mobile device 100 is brought to the second floor will be discussed next. If the charging station having the reference barometric sensor 200 built therein is also brought to the second floor, there will be no change in their relative level and thus there will be no problem regardless of on what floor the autonomous mobile device 100 is used. However, the autonomous mobile device 100 may be brought to the second floor in a detached house. In such a case, the level difference is naturally increased to a given value or larger and the autonomous mobile device 100 is restricted in movement. As countermeasures, the restriction may manually be cancelled or, for example, a second floor mode may be provided to switch the given level difference.

Specifically, multiple different values are prepared and the above-described given value that is a threshold for restricting the movement is made switchable. Then, the given value is switched depending on the floor such as to, for example, 10 cm in the first floor mode and to, for example, 2 m in the second floor mode. As a result, with the charging station installed on the first floor, the parallel shift can be restricted when the level difference is equal to or larger than 2 m. The given value can be changed as appropriate and may be determined with consideration for the floor surface of the second floor (for example, when the floor surface of the second floor is at a level of 1.9 m, the given value is set to 2 m).

Moreover, it is possible to make the autonomous mobile device 100 learn that it is movable in a large area at a specific level, namely on the floor of the second floor and then impose no restriction from the next time and on even if the autonomous mobile device 100 is brought to the second floor.

An embodiment is described above. The above-described embodiment is given by way of example and needless to say, the configuration of the autonomous mobile device 100 and the contents of the movement control procedure are not confined to those described in the above embodiment.

In the above-described embodiment, the movement is restricted when the level difference is equal to or larger than a given value. However, even if the level difference is equal to or larger than a given value, there may be no need of restricting the movement in some cases such as while moving on an inclined surface such as a slope. Then, an autonomous mobile device 100' according to a modified embodiment in FIG. 5 does not restrict the movement where there is no need of restricting the movement even if the level difference between the floor surface and the device is equal to or larger than a given value. Specifically, the autonomous mobile device 100' is different from the autonomous mobile device 100 in additionally comprising the function of a movement determiner 14. The following explanation will be made with the focus on this difference.

Figure 5:
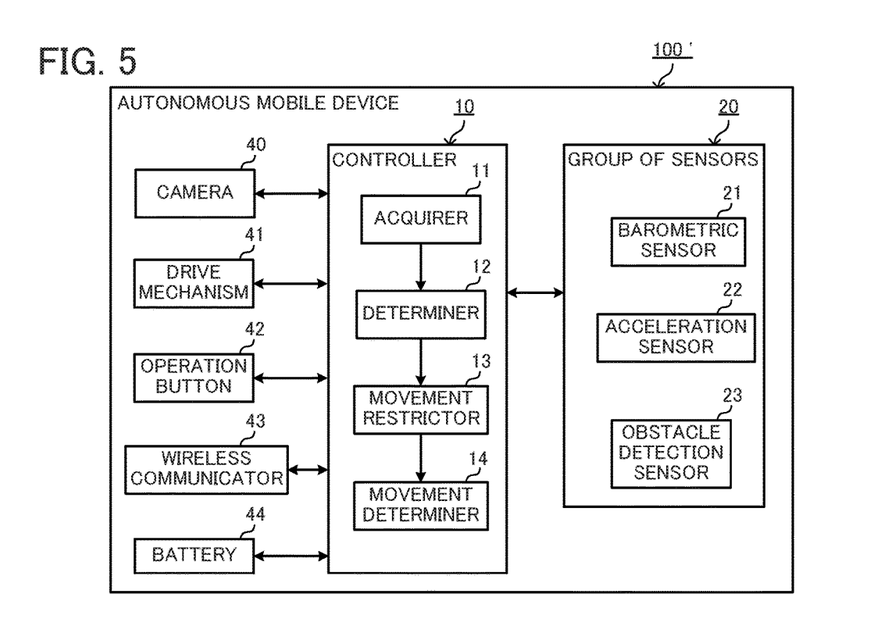
FIG. 5 is a diagram showing the configuration of the autonomous mobile device according to a modified embodiment.

The movement determiner 14 determines whether the device is moving. Specifically, the movement determiner 14 determines whether the device is moving based on whether the wheels constituting the drive mechanism 41 are rotating. The rotation may be detected based on whether the motor are driving or the presence/absence of pulses obtained by attaching encoders to the wheels. Generally, if the device is moving at the time of detecting a level difference from the floor surface, it is highly likely that the device is running at a higher point than the floor surface (for example, on an inclined surface). In such a case, there is no risk of fall and the movement is not restricted. On the other hand, if the device is not moving at the dime of detecting a level difference from the floor surface, it is highly likely that the device is lifted by the user or placed and stands still on the surface of an object such as a table. In such a case, there is the risk of fall and the movement is restricted.

Figure 6:
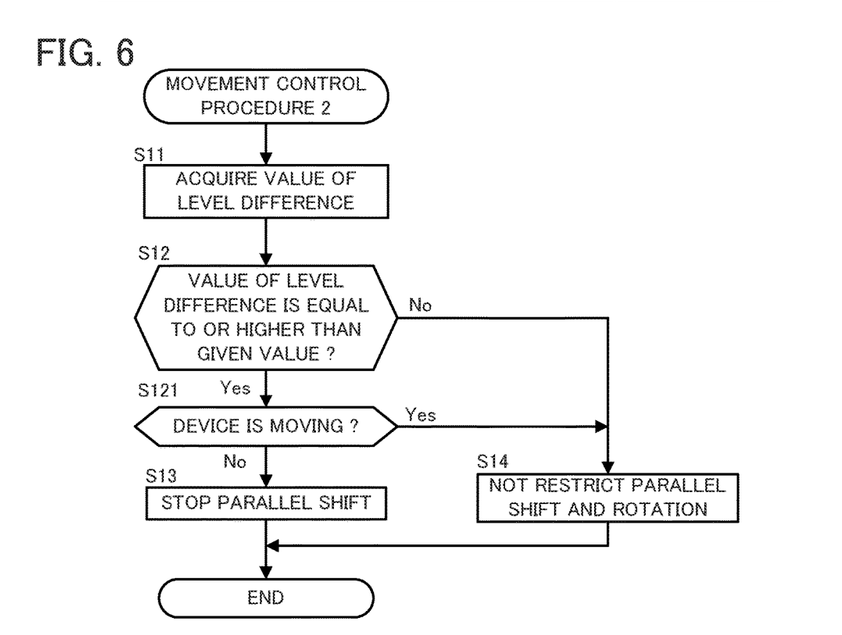
FIG. 6 is a flowchart of the movement control procedure according to the modified embodiment.

The movement control procedure 2 according to the modified embodiment will be described here with reference to FIG. 6. The movement control procedure 2 is different from the movement control procedure in that a new step S121 is added. The following explanation will be made with the focus on this different step S121.

In the movement control procedure 2, if the determiner 12 determines that the value of level difference is equal to or higher than a given value (Step S12; Yes), the movement determiner 14 determines whether the device is moving (Step S121). If the movement determiner 14 determines that the device is moving (Step S121; Yes), the movement restrictor 13 does not restrict the parallel shift and rotation (Step S14). On the other hand, if the movement determiner 14 does not determine that the device is moving (Step S121; No), the movement restrictor 13 stops the parallel shift (Step S13).

Since the movement control procedure 2 is executed at given intervals (for example, intervals of one second), change in the level difference can be monitored nearly in real time. For example, if the level difference is gradually increased while it is continuously detected that the device is moving, it is known that the device is running on an inclined surface, whereby the movement is not restricted. On the other hand, if the level difference is gradually increased while the device is not moving, it is known that the device is lifted by the user and placed at a high position above the floor surface, whereby the movement is restricted.

As described above, the autonomous mobile device 100' according to the modified embodiment comprises the movement determiner 14 and when the device is moving, generally does not restrict the movement (for example, the parallel shift and rotation) even if the level difference between the device and floor surface is equal to or larger than a given value. As a result, it is possible to prevent the movement from being restricted while the device is running on an inclined surface such as a slope where there is no risk of fall. Therefore, unnecessary restriction on the movement is not imposed and the movement is restricted only when there is the risk of fall, whereby the fall can be prevented with higher accuracy.

Moreover, in the above-described embodiment and modified embodiment, the barometric sensor 21 or acceleration sensor 22 is used to acquire the level difference between the floor surface and device. This is not restrictive. For example, a global positioning system (GPS) may be used to specify the absolute level of the device or combined with a barometric sensor to improve the accuracy.

Moreover, in the above-described embodiment and modified embodiment, the autonomous mobile device 100 (100') restricts the movement when the level difference is equal to or larger than a given value. This is not restrictive. For example, the movement may be restricted when the level difference falls within a given movement restriction range (within a movement restriction range defined by a first given value presenting a lower limit and a second given value presenting an upper limit). For example, the parallel shift may be stopped when the level difference falls within a movement restriction range of, for example, 10 cm (the first given value) to 2 m (the second given value). This is because within reach of a hand of a person, it is highly likely that the autonomous mobile device 100 (100') is placed on an object high above the floor surface (for example, on a table or shelf). On the other hand, with a level difference exceeding 2 m, it is likely that the autonomous mobile device 100 (100') is placed on the floor surface of an upper floor. As just described, if the movement is restricted only within a range in which there is the risk of fall, the fall can be prevented with accuracy.

Additionally, the above movement restriction range may comprise multiple different non-overlapped ranges. In other words, multiple different ranges such as a first movement restriction range (for example, 10 cm to 2 m) that is a first floor mode and a second movement restriction range (for example, 2.1 m to 4 m) that is a second floor mode are preset. Then, the determiner 12 determines whether the acquired value of level difference falls within any one of the multiple different movement restriction ranges. Then, the movement restrictor 13 restricts the parallel shift of the device when the value of level difference falls within any one movement restriction range (in other words, falls within the first or second movement restriction range), and does not restrict the parallel shift of the device when the value of level difference falls within none of the movement restriction ranges (in other words, does not fall within the first and second movement restriction ranges).

As described above, with multiple movement restriction ranges for restricting the movement of the device being specified, the movement is restricted when the level difference falls within any of the ranges (falls within the movement restriction range for the first or second floor) and is not restricted when the level difference falls within none of the ranges (on the floor surface of the first or second floor). As a result, the movement is restricted on multiple floors simultaneously with accuracy and the movement is not restricted while running on the floor surface of each of the multiple floors, whereby the fall on each floor can be prevented with accuracy.

Moreover, the above embodiment and modified embodiment are described on the assumption that the movement of the autonomous mobile device 100 (100') is the parallel shift and rotation. This is not restrictive. For example, when the autonomous mobile device 100 (100') is a toy, the autonomous mobile device 100 (100') moves according to the type of the toy. In other words, when the level difference is smaller than a given value, the autonomous mobile device 100 (100') continues to move according to the type of the toy. For example, if it is a toy car, the autonomous mobile device 100 (100') continues to run freely. If it is an animal robot, the autonomous mobile device 100 (100') continues some movement imitating the animal.

The functions of the autonomous mobile device 100 of the present disclosure can be implemented by a computer such as a conventional personal computer (PC). Specifically, the above embodiment is described on the assumption that programs for the movement control procedure executed by the autonomous mobile device 100 are prestored in the ROM of the controller 10. However, the programs may be saved and distributed on a non-transitory computer-readable recording medium such as a flexible disc, compact disc read only memory (CD-ROM), digital versatile disc (DVD), and magnet optical disc (MO) and installed on a computer to configure a computer capable of realizing the above-described functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An autonomous mobile device, comprising:
a drive mechanism which is operable to perform parallel shifting to change a position of the device and to perform a rotation operation to rotate the device;
a controller which controls the drive mechanism; and
a barometric sensor;
wherein the controller controls the drive mechanism to restrict the parallel shifting and so as not to restrict the rotation operation, when a difference between an atmospheric pressure acquired by the barometric sensor and a reference atmospheric pressure acquired by another barometric sensor installed on a datum level is equal to or larger than a predetermined value.

2. The autonomous mobile device according to claim 1, wherein the predetermined value is switchable between multiple different values.

3. The autonomous mobile device according to claim 1, wherein:
the controller acquires a value of a level difference between the datum level and the device;
the controller determines whether the value of the level difference acquired by the acquirer is equal to or higher than a given value;
when the controller determines that the value is equal to or higher than the given value and that the device is not moving, the controller restricts the parallel shifting of the device; and
when the controller determines that the value is equal to or higher than the given value and that the device is moving, the controller does not restrict movement of the device.

4. The autonomous mobile device according to claim 1, wherein:
the controller acquires a value of a level difference between the datum level and the device;
the controller determines whether the acquired value of the level difference falls within a movement restriction range defined by a first given value representing a lower limit and a second given value representing an upper limit; and
the controller restricts the parallel shifting of the device when the controller determines that the value of the level difference falls within the movement restriction range.

5. The autonomous mobile device according to claim 4, wherein:
the movement restriction range comprises multiple different non-overlapped movement restriction ranges;
the controller determines whether the acquired value of the level difference falls within any one movement restriction range among the multiple different movement restriction ranges; and
the controller restricts the parallel shifting of the device when the controller determines that the value of the level difference falls within any one movement restriction range and does not restrict the parallel shifting of the device when the controller determines that the value of the level difference falls within none of the movement restriction ranges.

6. An autonomous mobile device, comprising:
a drive mechanism which is operable to perform parallel shifting to change a position of the device and to perform a rotation operation to rotate the device;
a controller which controls the drive mechanism; and
an acceleration sensor;
wherein the controller controls the drive mechanism to restrict the parallel shifting and so as not to restrict the rotation operation, when a value of a level difference obtained by calculating a double integral of acceleration in a vertical direction from a datum level acquired by the acceleration sensor is equal to or larger than a predetermined value.

7. A non-transitory recording medium storing a program that is executable by a computer to perform functions comprising:
- controlling parallel shifting which changes a position of a device, the parallel shifting being performed by a drive mechanism of the device;
- controlling a rotation operation which rotates the device, the rotation operation being performed by the drive mechanism;
- acquiring a value of a level difference between a datum level and the device by a barometric sensor;
- determining whether the acquired value of the level difference is equal to or higher than a given value; and
- restricting parallel shifting of the device by the drive mechanism when it is determined that the value is equal to or higher than the given value.

8. A method for controlling a device, the method comprising:
- controlling parallel shifting which changes a position of the device, the parallel shifting being performed by a drive mechanism of the device;
- controlling a rotation operation which rotates the device, the rotation operation being performed by the drive mechanism;
- acquiring a value of a level difference between a datum level and the device by a barometric sensor;
- determining whether the acquired value of the level difference is equal to or higher than a given value; and
- restricting parallel shifting of the device by the drive mechanism when it is determined that the value is equal to or higher than the given value.

* * * * *

UNITED STATES PATENT AND TRADEMARK OFFICE
CERTIFICATE OF CORRECTION

PATENT NO. : 10,152,057 B2
APPLICATION NO. : 15/332109
DATED : December 11, 2018
INVENTOR(S) : Yoshihiro Kawamura et al.

It is certified that error appears in the above-identified patent and that said Letters Patent is hereby corrected as shown below:

In the Claims

Column 8, Line 17, Claim 3, Line 6, after "acquired" delete "by the acquirer".

Signed and Sealed this
Twenty-sixth Day of March, 2019

Andrei Iancu
*Director of the United States Patent and Trademark Office*